United States Patent Office 2,803,585
Patented Aug. 20, 1957

2,803,585

METHOD OF RECOVERING PROTEOLYTIC PANCREAS ENZYMES FROM MAMMALIAN PANCREAS GLANDS SUBSEQUENT TO INSULIN REMOVAL

Svend Emil Frederiksen, Charlottenlund, Denmark, assignor to Novo Terapeutisk Laboratorium A/S, Copenhagen, Denmark, a joint-stock company of Denmark No Drawing. Original application October 23, 1946, Serial No. 705,248. Divided and this application January 3, 1951, Serial No. 209,326

Claims priority, application Denmark June 4, 1943

8 Claims. (Cl. 167—75)

The present invention relates to a method in recovering the proteolytic pancreas enzymes, in the following simply called enzymes, from mammals, particularly horned cattle and pigs, in connection with the preparation of insulin from the same glands.

The technical recovery of insulin from pancreas glands of mammals, particularly horned cattle and pigs, is carried out by treating the minced glands with suitable extracting agents able to dissolve the insulin and under such circumstances that the enzymes are prevented from inactivating the insulin. In the literature water, ethyl and methyl alcohol, in the following simply called alcohol, acetone or mixtures of these substances with or without addition of acids, alkalies or salts, are indicated as suitable extracting agents. However, it is common to most of the methods that alcohol or acetone is added at a certain moment either at once, i. e. to the minced glands themselves or later on to a for instance aqueous extract thereof and then the insulin may be prepared in pure form without particular regard being paid to the enzymes and without any traceable inactivation of the insulin taking place.

In the glands taken out of the animals immediately after slaughtering no active enzymes are found. The enzymes are present in a completely inactive condition, but they will rapidly be transformed into the active condition unless the glands are at once frozen down to below 0° C. As the active enzymes act inactivating upon the insulin, even at a low temperature, always fresh or well-preserved glands, i. e. immediately frozen glands, in which the enzymes consequently are completely or almost completely inactive, are used in the preparation of insulin to obtain the best possible yields thereof.

When pure insulin can be produced by the extraction methods mentioned above without any traceable inactivation of the insulin taking place this has been attributed to the employed alcohol or acetone which, according to some investigators, destroys the enzymes. Consequently, the substances separated during the insulin preparation have been considered as unsuitable for recovering the enzymes of the pancreas glands and, generally speaking, the said substances have been considered as a residual material which may only be used as fodder etc.

Therefore, in the production of pancreas enzyme preparations which have lately found various technical and pharmaceutical applications it has hitherto been necessary to use the glands directly either by extracting the enzymes by treatment with suitable extracting agents, preferably aqueous liquids, or by simply drying the glands, removing their fats, if desired, and pulverizing them, such glands being used in which all enzymes are activated by storage for a shorter or longer period dependent on the temperature and at any rate so long that all inactive enzyme has been transformed into active enzyme.

The present invention is based upon the new observation that the enzymes are not destroyed during the treatment with alcohol or acetone for the purpose of recovering insulin, but that hereby a precipitation of the enzymes is effected contingent upon the concentration of the employed alcohol or acetone. However, the precipitation also depends on the proportion of liquid and substance during the extraction (the ratio of extraction) but if not quite extreme proportions are used, the precipitation will occur at above 20 to 60% of alcohol or acetone, 20% applying to a small ratio of extraction and 60% to a large ratio of extraction. Thus, the enzymes are in reality found in the residue from the recovery of insulin when 20 to 60% of alcohol or acetone are used for the recovery. Among the numerous substances separated during the purification of the insulin no enzyme is found. Thus, the good result of the insulin recovery is obviously caused by the fact that at a given moment a solvent is used which under the conditions in question at the same time acts as a precipitating agent for the enzymes. The latter are consequently present in undissolved or inactive condition in the residue from the preparation of the insulin from fresh or well-preserved glands and cannot be activated until they are resolved.

In order to obtain an active enzyme preparation from the residue from the insulin recovery one should consequently, according to the invention, only take care of dissolving the precipitated enzymes and then subjecting them to activation.

In accordance herewith the method according to the invention is characterized in that the residue arising during the production of insulin from minced fresh or well-preserved glands by treating the latter or extracts thereof at a suitable pH-value with an amount of alcohol or acetone sufficient to produce an alcohol or acetone concentration above 20 to 60% and separating the liquid, is subjected to an enzyme extraction in the presence of below 20 to 60% of alcohol or acetone. Expressed in another way, during the insulin preparation the concentration of alcohol or acetone should be above $30 \pm 10\%$, while an alcohol or acetone concentration below $30 \pm 10\%$ should be used during the extraction of the enzymes, the value $30 + 10\%$ (i. e. 40%) being used in connection with a large ratio of extraction and the value $30 - 10\%$ (i. e. 20%) in connection with a small ratio of extraction.

According to the present invention it will consequently be possible to produce insulin and enzymes from the same glands by first extracting the insulin at a suitable pH-value in the presence of an amount of alcohol or acetone sufficient to create a concentration thereof above 20 to 60% or adding alcohol or acetone to an extract of the glands up to a concentration of 20 to 60%, working up the insulin from this liquid and then subjecting the residue to an enzyme extraction, care being taken that below 20 to 60% of alcohol or acetone are present during the said extraction, or in other words substituting the precipitating agent by an enzyme dissolving agent and then activating the dissolved enzyme.

For further illustrating the importance of the alcohol or acetone concentration it shall be mentioned, ethyl alcohol being used as an example, that with a ratio of extraction of 7:1 the precipitation of the enzymes begins at about 30% alcohol and is practically quantitative at about 40%. Consequently, in this case an ethyl alcohol concentration of above 40% ought to be used during the extraction of the insulin while the alcohol concentration ought to lie below 30% during the enzyme extraction.

The yield of enzymes obtainable by the method of the invention depends on the conditions during the insulin recovery and during the enzyme recovery.

As to the conditions during the insulin recovery the yield of enzymes is independent of the employed alcohol or acetone concentration when the latter is above 20 to 60% and independent of the employed period of extraction if only the latter has been so long that the employed alcohol or acetone has come into contact with the enzymes and precipitated them.

As to the conditions of the enzyme recovery the yield primarily depends on the concentration of the alcohol or acetone used. At 20 to 60% alcohol or acetone and higher—dependent on the ratio of extraction—the enzymes remain undissolved, and below the said concentration the enzymes begin to dissolve and the yield is then highly increasing with decreasing alcohol or acetone concentration. Also the extraction period plays a role so that reduced extraction periods give decreasing yields.

Technically it is preferred to use water for dissolving the enzymes and it has been found that an extraction with water for a period of 24 hours gives good yields when using 7 parts of the extracting liquid.

As it appears from the above stated it is decisive for the yield of enzymes that the contents of alcohol or acetone in the residue from the insulin manufacture are brought down below 20 to 60%. To obtain this a residue with high alcohol or acetone contents may be treated with sufficient amounts of the enzyme dissolving agent, for instance water. It is more appropriate first to remove the main portion of the alcohol or acetone contents of the residue, for instance by pressing, and then to effect the enzyme extraction. Hereby more concentrated enzyme solutions and better conditions for recovering the employed alcohol or acetone, are obtained.

The method according to the invention particularly aims at a utilization of the gland residue from the acid alcoholic insulin extraction. When for instance hydrochloride acid, phosphoric acid, lactic acid, or acetic acid is used during the said extraction the enzymes may be extracted from the residue by means of water when care is taken that below 20 to 60% alcohol are present during the extraction.

On the other side, when sulphuric acid is used in extracting the insulin it has been found that the enzymes are present in the residue in such a condition that they cannot be extracted directly, even if the alcohol or acetone concentration is zero during the enzyme extraction, the extraction period is long and the amount of extracting liquid is large. However, according to the invention an extraction is successful when a strong solution of urea, above 50% acetic acid, 85% formic acid, liquid phenol is used as extracting agent or when a cautious extraction by means of alkaline medium is employed. According to the invention it has been found, however, that a simple aqueous extraction may also be used if the residue is subjected to a short heating, for instance at 100° C.

As to the pH-value during the enzyme extraction it ought to lie between about 1 and 7, preferably 1 and 4.

Finally it may be remarked that my Patent No. 2,524,658, dated October 3, 1950 (Ser. No. 705,247 filed October 23, 1946) relates to a method of simultaneously recovering enzymes and insulin from pancreas, in which insulin and enzymes may also be recovered from the same gland material. However, this method is principally different from the method of the invention since it consists in first extracting the enzymes from fresh or well-preserved glands by means of an acid aqueous extracting agent at low temperature and/or with short period of extraction and then recovering the insulin from the extraction residue according to known methods.

The following examples illustrate the method according to the invention:

*Example 1*

1 kilogram of fresh or well-preserved pancreas glands is minced and extracted for 3 hours with 4 litres of 80% ethyl alcohol to which 30 cc. of concentrated hydrochloric acid have been added. The liquid is filtered off and may be worked up into insulin in the usual manner while the residue is subjected to enzyme extraction for 24 hours with 7 litres of water and then centrifugated and the enzymes are recovered from the liquid. A yield of about 10 million Fuld-Gross units is obtained.

*Example 2*

1 kilogram of fresh or well-preserved pancreas glands is minced and extracted for 4 hours with 6 litres of 80% acetone to which 35 cc. concentrated hydrochloric acid have been added. The liquid is filtered off and may be worked up into insulin in the usual manner. The residue is subjected to enzyme extraction for 24 hours with 7 litres of water and then centrifugated and the enzymes are recovered from the liquid. A yield of about 10 million Fuld-Gross units is obtained.

*Example 3*

1 kilogram of fresh or well-preserved pancreas glands is minced and extracted for 3 hours with 2 litres of 80% ethyl alcohol to which 10 cc. of concentrated sulphuric acid have been added. The liquid is centrifugated and may be worked up into insulin in the usual manner while the residue is subjected to enzyme extraction with 3 litres of 33% urea solution for 2 hours. After centrifugation the enzymes are recovered from the liquid. A yield of about 8 million Fuld-Gross units is obtained.

*Example 4*

1 kilogram of fresh or well-preserved pancreas glands is minced and extracted for 8 hours with 6 litres of 80% ethyl alcohol to which are added 10 cc. of concentrated sulphuric acid. The liquid is centrifugated and may be worked up into insulin in the usual manner while the residue after pressing is mixed with 4 litres of water, to which 20 cc. of concentrated hydrochloric acid are added, and heated quickly to 100° C. and cooled again immediately thereafter. After centrifugation the enzymes are recovered from the liquid. A yield of about 9 million Fuld-Gross units is obtained.

These yields express average yields. With particularly high class gland material considerably higher yields may be obtained.

This application is a division of my co-pending application Serial No. 705,248 filed October 23, 1946, now Patent 2,571,126.

Having thus fully described my invention I claim as new and desire to secure by Letters Patent:

1. A method of recovering proteolytic enzymes from mammalian pancreas glands, which comprises adding water to the residual gland material resulting from the treatment of minced pancreas gland with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 7, thereby bringing the proteolytic enzymes contained in the residual gland material into solution in an acid milieu, and recovering the dissolved enzymes.

2. A method of recovering proteolytic enzymes from mammalian pancreas glands, which comprises removing the main portion of the insulin extracting solution from the residual gland material resulting from the treatment of minced pancreas gland with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 7, adding water to said residual gland material, thereby bringing the proteolytic enzymes contained in the residual gland material into solution in an acid milieu, and recovering the dissolved enzymes.

3. A method in recovering insulin and proteolytic pancreas enzymes from mammalian pancreas glands, which comprises treating a minced pancreas gland material with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 7, separating the insulin-containing liquid from the treated gland material, recovering the dissolved insulin from the separated liquid, adding water to the separated residual gland material to dissolve the proteolytic enzymes, and recovering the dissolved enzymes.

4. A method in recovering insulin and proteolytic pancreas enzymes from mammalian pancreas glands, which comprises treating a minced pancreas gland material with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 7, separating the insulin-containing liquid from the treated gland material, recovering the dissolved insulin from the separated liquid, removing the main portion of the insulin extracting solvent from the separated residual gland material, adding water to the residual gland material to dissolve the proteolytic enzymes, and recovering the dissolved enzymes.

5. A method of recovering proteolytic enzymes from mammalian pancreas glands, which comprises adding water to the residual gland material resulting from the treatment of minced pancreas gland with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 4, thereby bringing the proteolytic enzymes contained in the residual gland material into solution in an acid milieu, and recovering the dissolved enzymes.

6. A method of recovering proteolytic enzymes from mammalian pancreas glands, which comprises removing the main portion of the insulin extracting solution from the residual gland material resulting from the treatment of minced pancreas gland with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 4, adding water to said residual gland material to create an acid milieu of pH 1 to 4, thereby bringing the proteolytic enzymes contained in the residual gland material into solution in an acid milieu, and recovering the dissolved enzymes.

7. A method in recovering insulin and proteolytic pancreas enzymes from mammalian pancreas glands, which comprises treating a minced pancreas gland material with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 4, separating the insulin-containing liquid from the treated gland material, recovering the dissolved insulin from the separated liquid, adding water to the separated residual gland material to dissolve the proteolytic enzymes, and recovering the dissolved enzymes.

8. A method in recovering insulin and proteolytic pancreas enzymes from mammalian pancreas glands, which comprises treating a minced pancreas gland material with a conventional insulin extracting concentration of a solvent selected from the group consisting of methyl alcohol, ethyl alcohol, and acetone acidified with a mineral acid selected from the group consisting of hydrochloric acid and phosphoric acid to create an acid milieu having a pH below 4, separating the insulin-containing liquid from the treated gland material, recovering the dissolved insulin from the separated liquid, removing the main portion of the insulin extracting solvent from the separated residual gland material, adding water to the residual gland material to create an acid milieu of pH 1 to 4 to dissolve the proteolytic enzymes, and recovering the dissolved enzymes.

References Cited in the file of this patent

UNITED STATES PATENTS

| | | |
|---|---|---|
| 412,836 | Carnrich | Oct. 15, 1889 |
| 1,469,994 | Banting et al. | Oct. 9, 1923 |
| 2,353,016 | Daughenbaugh | July 4, 1944 |
| 2,524,658 | Frederiksen | Oct. 3, 1950 |

FOREIGN PATENTS

| | | |
|---|---|---|
| 445,131 | Belgium | of 1942 |

OTHER REFERENCES

Kunitz et al.; Science, Dec. 15, 1933, pp. 558–559.
Rabinowitch et al.: Biol. Chem., November 1938, pp. 109–115.